US012656710B2

(12) United States Patent
Akamatsu et al.

(10) Patent No.: US 12,656,710 B2
(45) Date of Patent: Jun. 16, 2026

(54) BELT ROTATING DEVICE AND IMAGE FORMING APPARATUS

(71) Applicant: FUJIFILM Business Innovation Corp., Tokyo (JP)

(72) Inventors: Hiroaki Akamatsu, Kanagawa (JP); Kazuya Nishimura, Kanagawa (JP); Kazuya Yasui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/157,156

(22) Filed: Jan. 20, 2023

(65) Prior Publication Data

US 2024/0027940 A1 Jan. 25, 2024

(30) Foreign Application Priority Data

Jul. 20, 2022 (JP) ................................ 2022-115866

(51) Int. Cl.
*G03G 15/20* (2006.01)
*G03G 15/16* (2006.01)

(52) U.S. Cl.
CPC ................................ *G03G 15/1615* (2013.01)

(58) Field of Classification Search
CPC .. G03G 15/14; G03G 15/1615; G03G 15/755; G03G 2215/0177
USPC ................................ 399/162, 297, 310–313
See application file for complete search history.

(56) References Cited

FOREIGN PATENT DOCUMENTS

| | | | |
|---|---|---|---|
| JP | 2006-267376 | A | 10/2006 |
| JP | 2008-076999 | A | 4/2008 |
| JP | 2013076886 | * | 4/2013 |
| JP | 2017-049342 | A | 3/2017 |

* cited by examiner

*Primary Examiner* — Hoan H Tran
(74) *Attorney, Agent, or Firm* — Sughrue Mion, PLLC

(57) ABSTRACT

A belt rotating device includes: an endless belt having a projection at an axial end of an inner peripheral surface thereof; a first roll limiting an axial movement of the belt by contacting the projection; and a second roll including large-diameter, small-diameter, and transition portions, the small-diameter portion located on an axially outer side relative to the large-diameter portion, the transition portion having an outside diameter that decreases from the large-diameter portion to the small-diameter portion. The belt is wrapped around the large-diameter portion with an outer peripheral surface of the small-diameter portion or the transition portion facing the projection in a radial direction, and a radial gap, from a part of the outer peripheral surface where the outer peripheral surface faces the projection to an outer peripheral surface of the large-diameter portion, is greater than a height of the projection from the inner peripheral surface of the belt.

20 Claims, 10 Drawing Sheets

BELT ROTATING DEVICE AND IMAGE FORMING APPARATUS

CROSS-REFERENCE TO RELATED APPLICATIONS

This application is based on and claims priority under 35 USC 119 from Japanese Patent Application No. 2022-115866 filed Jul. 20, 2022.

BACKGROUND

(i) Technical Field

The present disclosure relates to a belt rotating device and an image forming apparatus.

(ii) Related Art

According to Japanese Unexamined Patent Application Publication No. 2006-267376, an endless belt member that is stretched over a plurality of rolls is provided at a width-wise end portion thereof with a skew restricting member integrally formed with the endless belt member and configured to restrict any skew of the endless belt member.

According to Japanese Unexamined Patent Application Publication No. 2008-76999, an endless belt includes a belt body, and a meander preventing member having a belt shape extending along the inner peripheral surface of the belt body at least at one axial edge of the belt body, the meander preventing member having a cut portion provided on the inner side thereof in the axial direction of the belt body, the cut portion extending in the peripheral direction of the belt body.

According to Japanese Unexamined Patent Application Publication No. 2017-49342, a meander preventing member is provided along a peripheral edge of a base of a belt member having an endless belt shape and to be stretched over stretching members, in which letting the diameter of one of the stretching members that has the smallest diameter be X mm and the durometer hardness of the meander preventing member that is defined by a Japanese Industrial Standard (JIS) K 6253-3: 2012 be Y, $Y \geq 60$ and $Y \leq 1.2X+58$.

SUMMARY

A belt rotating device is supposed to include the following: an endless belt to be rotated; a projection provided at an axial end portion of an inner peripheral surface of the endless belt and extending in a peripheral direction of the endless belt; a first roll around which the endless belt is wrapped, the first roll being configured to limit an axial movement of the endless belt by coming into contact with the projection; and a second roll including a large-diameter portion and a small-diameter portion having a smaller diameter than the large-diameter portion, the small-diameter portion being continuous with the large-diameter portion on an axially outer side relative to the large-diameter portion. The second roll is configured such that the endless belt is wrapped around the large-diameter portion with an outer peripheral surface of the small-diameter portion facing the projection in a radial direction. A radial gap from a part of the outer peripheral surface of the small-diameter portion where the outer peripheral surface faces the projection to an outer peripheral surface of the large-diameter portion is greater than a height of the projection from the inner peripheral surface of the endless belt.

In such a belt rotating device, the endless belt may be bent toward the inner peripheral side at the boundary between the large-diameter portion and the small-diameter portion of the second roll, leading to the breakage of the endless belt.

Aspects of non-limiting embodiments of the present disclosure relate to making the probability of the breakage of the endless belt lower than in a case where the second roll includes a large-diameter portion and a small-diameter portion having a smaller diameter than the large-diameter portion and being continuous with the large-diameter portion on an axially outer side relative to the large-diameter portion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a belt rotating device including: an endless belt to be rotated; a projection provided at an axial end portion of an inner peripheral surface of the endless belt and extending in a peripheral direction of the endless belt; a first roll around which the endless belt is wrapped, the first roll being configured to limit an axial movement of the endless belt by coming into contact with the projection; and a second roll including a large-diameter portion, a small-diameter portion, and a transition portion, the small-diameter portion being located on an axially outer side relative to the large-diameter portion and having a smaller diameter than the large-diameter portion, the transition portion having an outside diameter that decreases from the large-diameter portion to the small-diameter portion, wherein the second roll is configured such that the endless belt is wrapped around the large-diameter portion with an outer peripheral surface of at least one of the small-diameter portion and the transition portion facing the projection in a radial direction, and such that a radial gap from a part of the outer peripheral surface where the outer peripheral surface faces the projection to an outer peripheral surface of the large-diameter portion is greater than a height of the projection from the inner peripheral surface of the endless belt.

BRIEF DESCRIPTION OF THE DRAWINGS

An exemplary embodiment of the present disclosure will be described in detail based on the following figures, wherein.

DETAILED DESCRIPTION

Image Forming Apparatus 10

Figure 1:
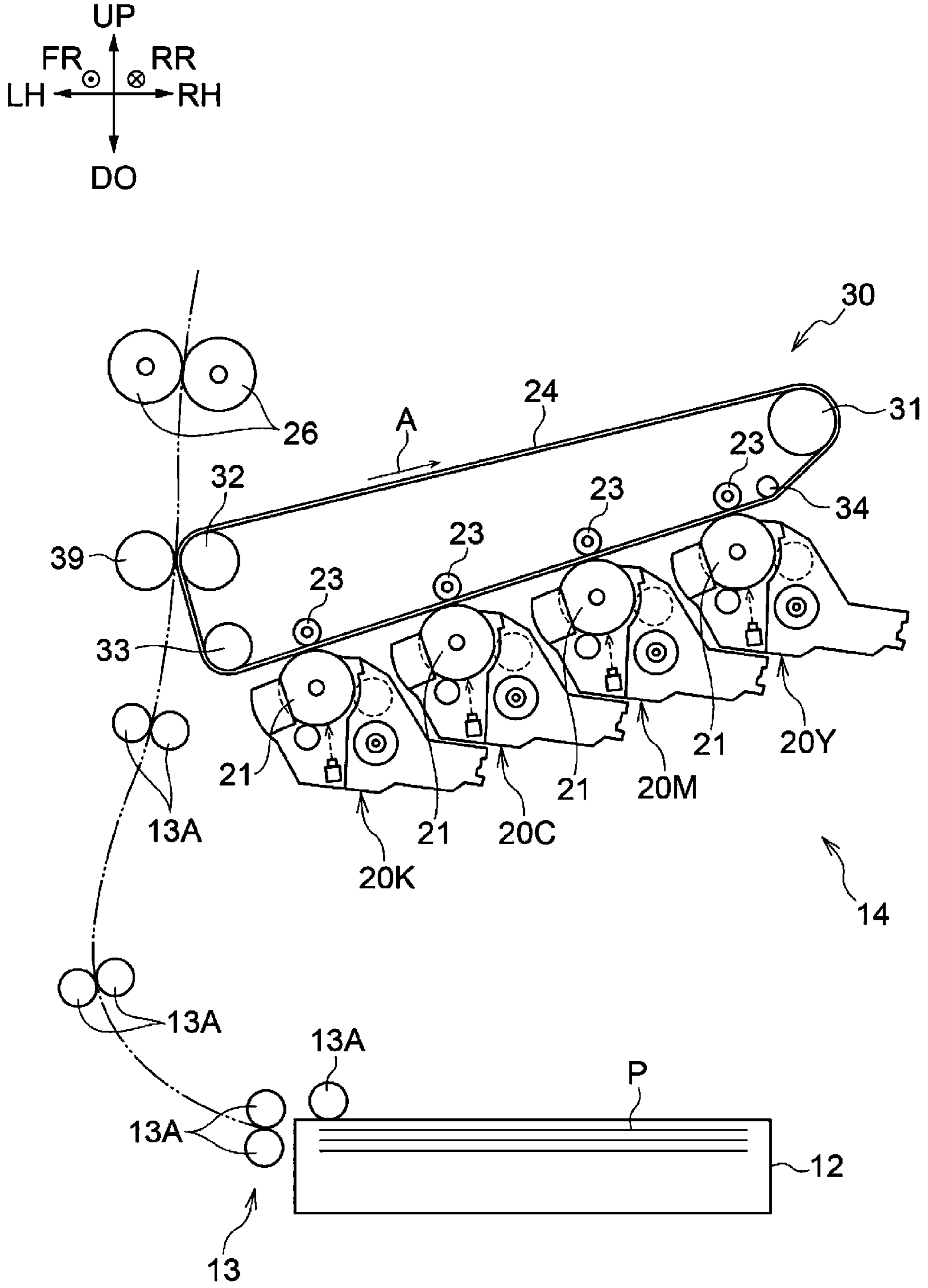
FIG. 1 schematically illustrates an image forming apparatus according to the present exemplary embodiment.

A configuration of an image forming apparatus 10 according to an exemplary embodiment will now be described. FIG. 1 schematically illustrates the image forming apparatus 10.

The drawings are provided with arrow UP, which represents the upward direction (heading toward the upper side in the vertical direction) of the apparatus 10; and arrow DO, which represents the downward direction (heading toward the lower side in the vertical direction) of the apparatus 10. The drawings are further provided with arrow LH, which represents the leftward direction of the apparatus 10; and arrow RH, which represents the rightward direction of the apparatus 10. The drawings are further provided with arrow FR, which represents the frontward direction of the apparatus 10; and arrow RR, which represents the rearward direction of the apparatus 10. The above directions are defined only for convenience of description and do not limit the orientation of the apparatus 10. The directions of the apparatus 10 may each be described with the omission of "of the apparatus 10". For example, "the upper side of the apparatus 10" may be simply referred to as "the upper side".

In the following description, the term "front-rear direction" may be used as "both the frontward direction and the rearward direction" or "one of the frontward direction and the rearward direction". The term "front-rear direction" is also regarded as a direction toward one side, a lateral direction, or a horizontal direction. The term "left-right direction" is also regarded as a direction toward one side, a lateral direction, or a horizontal direction. The top-bottom direction, the left-right direction, and the front-rear direction intersect one another (specifically, orthogonal to one another).

In the drawings, a circle with a cross represents an arrow heading from the front of the page toward the back of the page. Furthermore, a circle with a dot represents an arrow heading from the back of the page toward the front of the page.

The image forming apparatus 10 illustrated in FIG. 1 is configured to form an image. Specifically, as illustrated in FIG. 1, the image forming apparatus 10 includes a medium container 12, a transporting section 13, and an image forming section 14, which includes a transfer device 30. The individual elements of the image forming apparatus 10 will now be described.

Medium Container 12 and Transporting Section 13

The medium container 12 of the image forming apparatus 10 is configured to contain recording media P. The recording media P contained in the medium container 12 are each transported to the image forming section 14. The recording media P to be contained in the medium container 12 are each an object of image formation to be performed by the image forming section 14. Examples of the recording media P include sheets and films. Examples of the films include resin films and metal films. The recording media P are not limited to the above and may be of any of various kinds.

The transporting section 13 illustrated in FIG. 1 is configured to transport each of the recording media P contained in the medium container 12 to an output part (not illustrated). Specifically, as illustrated in FIG. 1, the transporting section 13 includes a plurality of transporting members 13A, which are transporting rolls or the like, and is configured to transport each of the recording media P by using the transporting members 13A. The transporting members 13A may be of any of various other kinds, for example, transporting belts, transporting drums, or the like.

Image Forming Section 14

The image forming section 14 illustrated in FIG. 1 is configured to form an image on a recording medium P transported by the transporting section 13 (namely, the transporting members 13A). Specifically, in the image forming section 14, a toner image (an exemplary image) is electrophotographically formed on a recording medium P. More specifically, as illustrated in FIG. 1, the image forming section 14 includes toner-image-forming units 20Y, 20M, 20K, and 20K (hereinafter denoted by 20Y to 20K); the transfer device 30, which includes a transfer belt 24; and a fixing unit 26.

The toner-image-forming units 20Y to 20K include respective photoconductors 21. The toner-image-forming units 20Y to 20K are each responsible for charging, exposure, and development processes, through which toner images in respective colors of yellow (Y), magenta (M), cyan (C), and black (K) are formed on the respective photoconductors 21.

In the image forming section 14, the transfer device 30 transfers the toner images formed on the respective photoconductors 21 of the toner-image-forming units 20Y to 20K to a recording medium P with the aid of the transfer belt 24. Details of the transfer device 30 will be described separately below.

In the image forming section 14, the toner images transferred to the recording medium P are fixed to the recording medium P by the fixing unit 26. Thus, the image forming section 14 employs an intermediate transfer scheme in which an image is transferred to a recording medium P with the aid of the transfer belt 24.

Transfer Device 30

Figure 2:
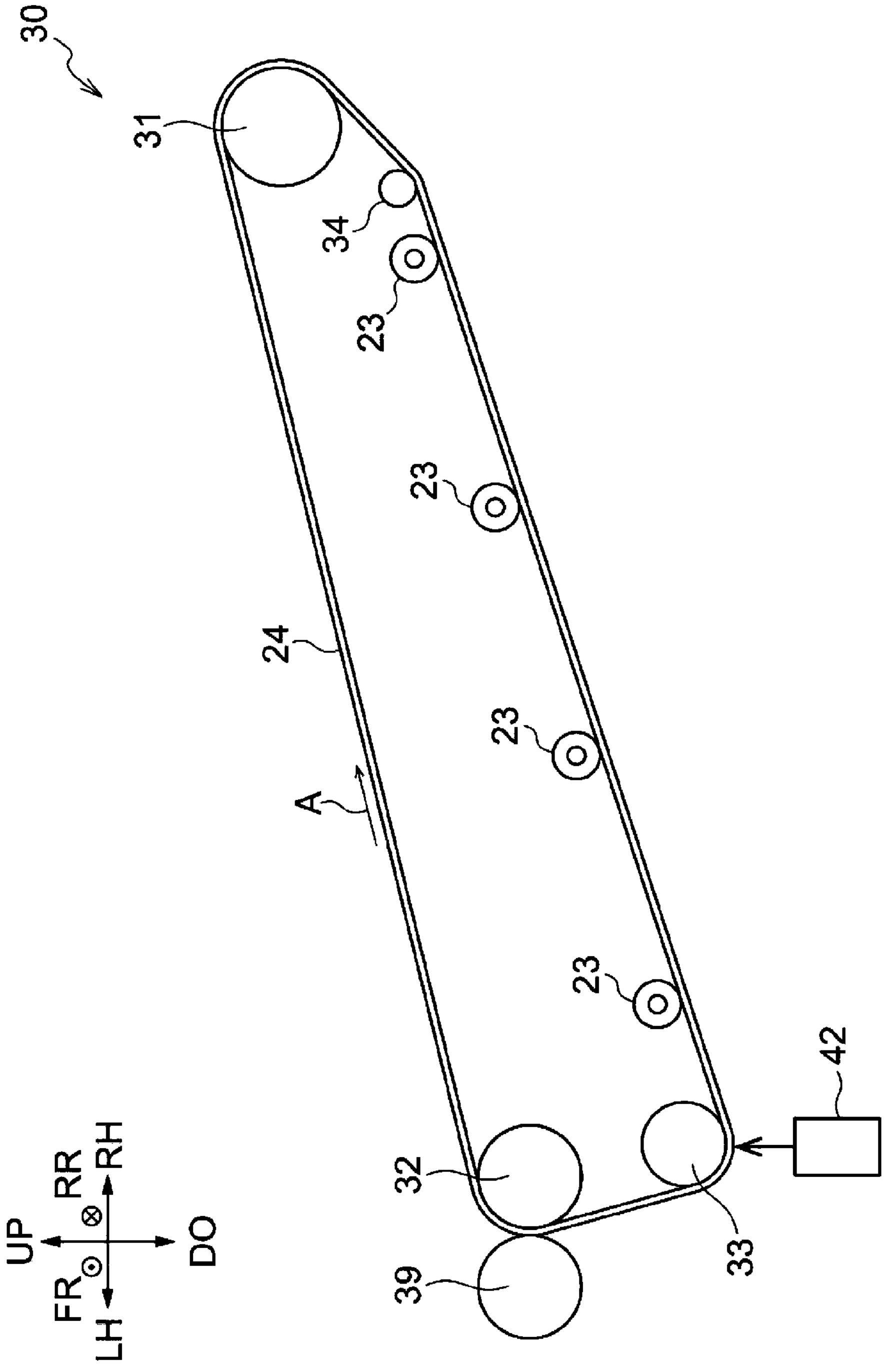
FIG. 2 schematically illustrates a transfer device according to the present exemplary embodiment.
Figure 3:
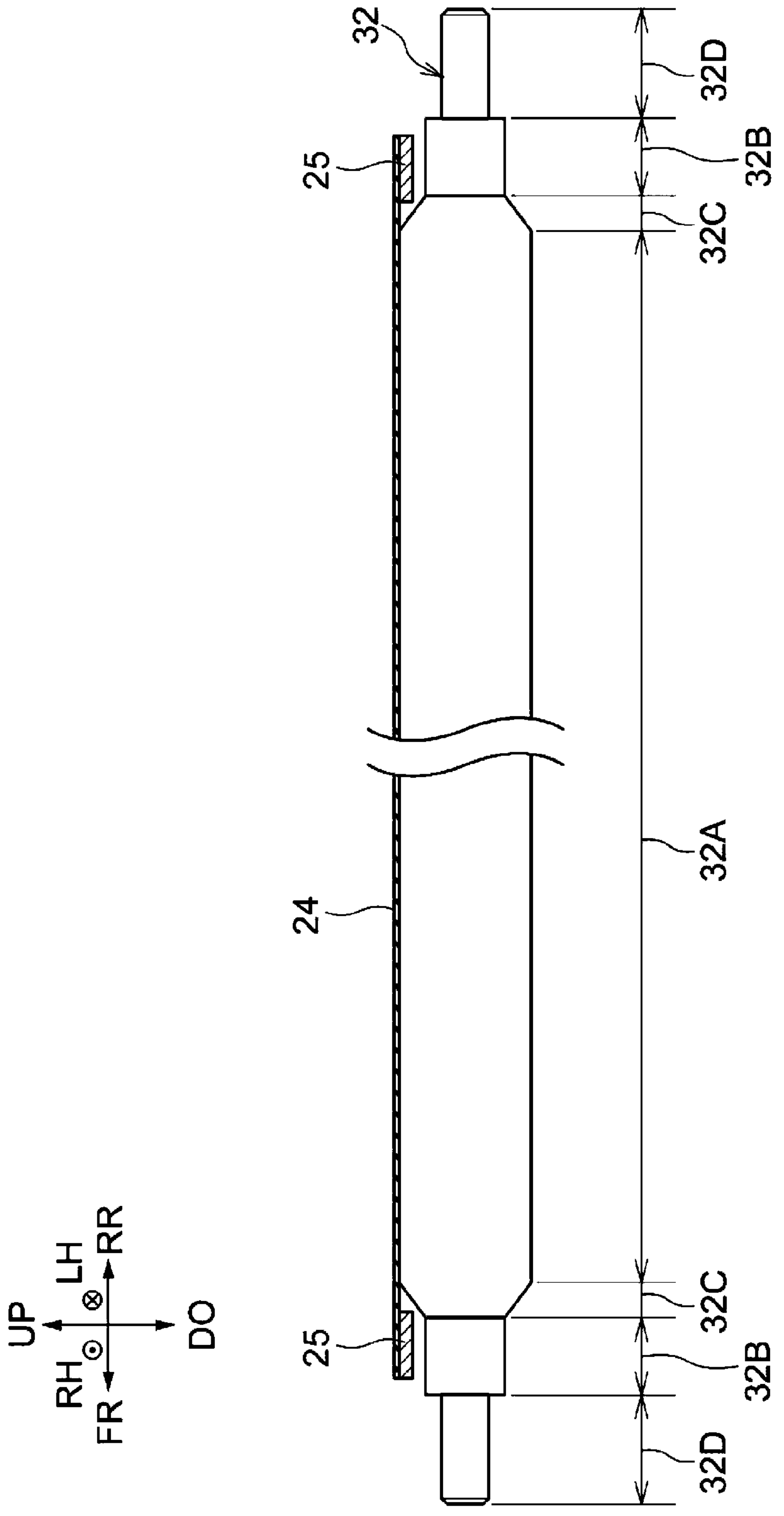
FIG. 3 is a side sectional view of a stretching roll, a transfer belt, and projections included in the transfer device according to the present exemplary embodiment.
Figure 4:
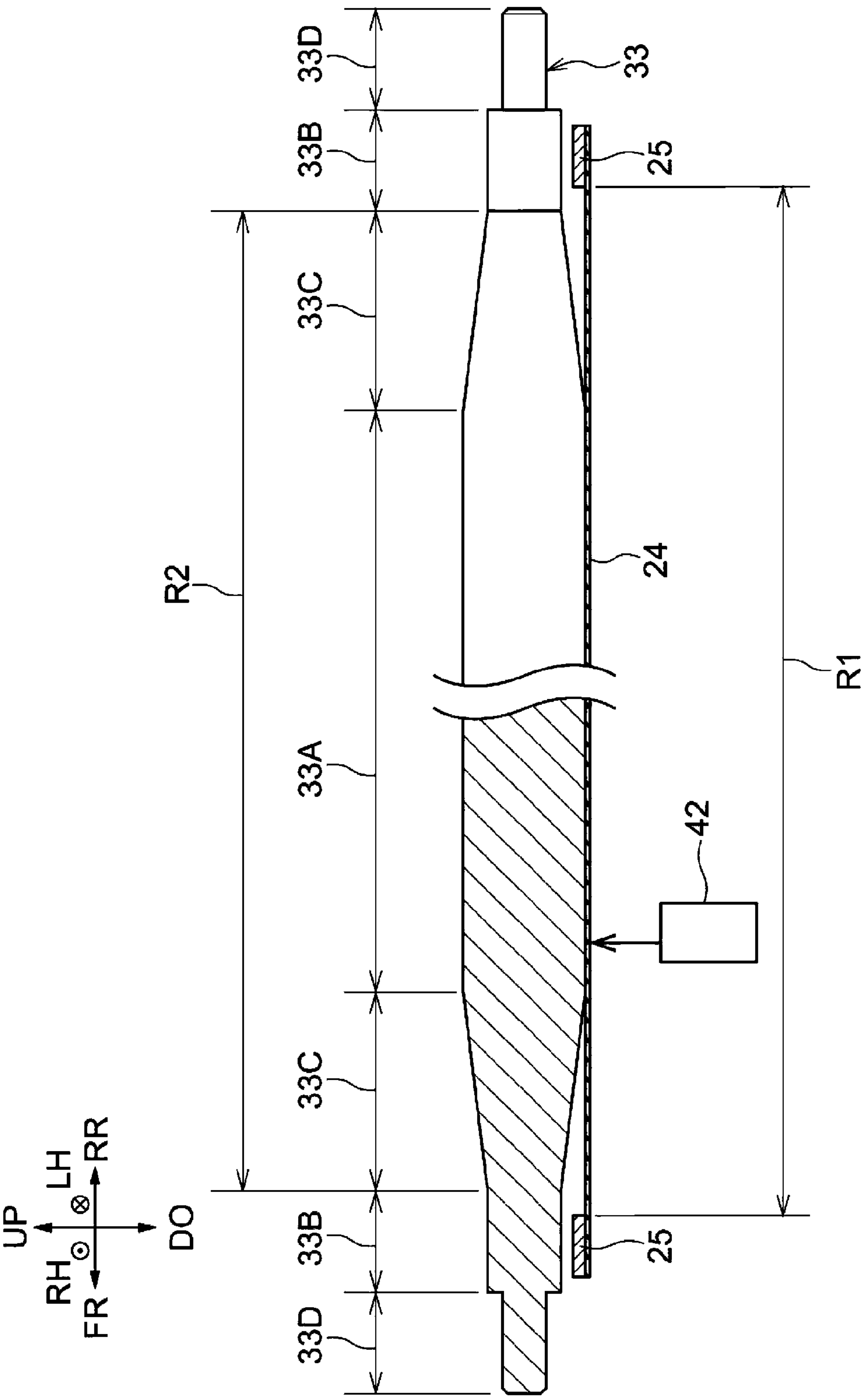
FIG. 4 is a side sectional view of another stretching roll, the transfer belt, and the projections included in the transfer device according to the present exemplary embodiment.
Figure 5:
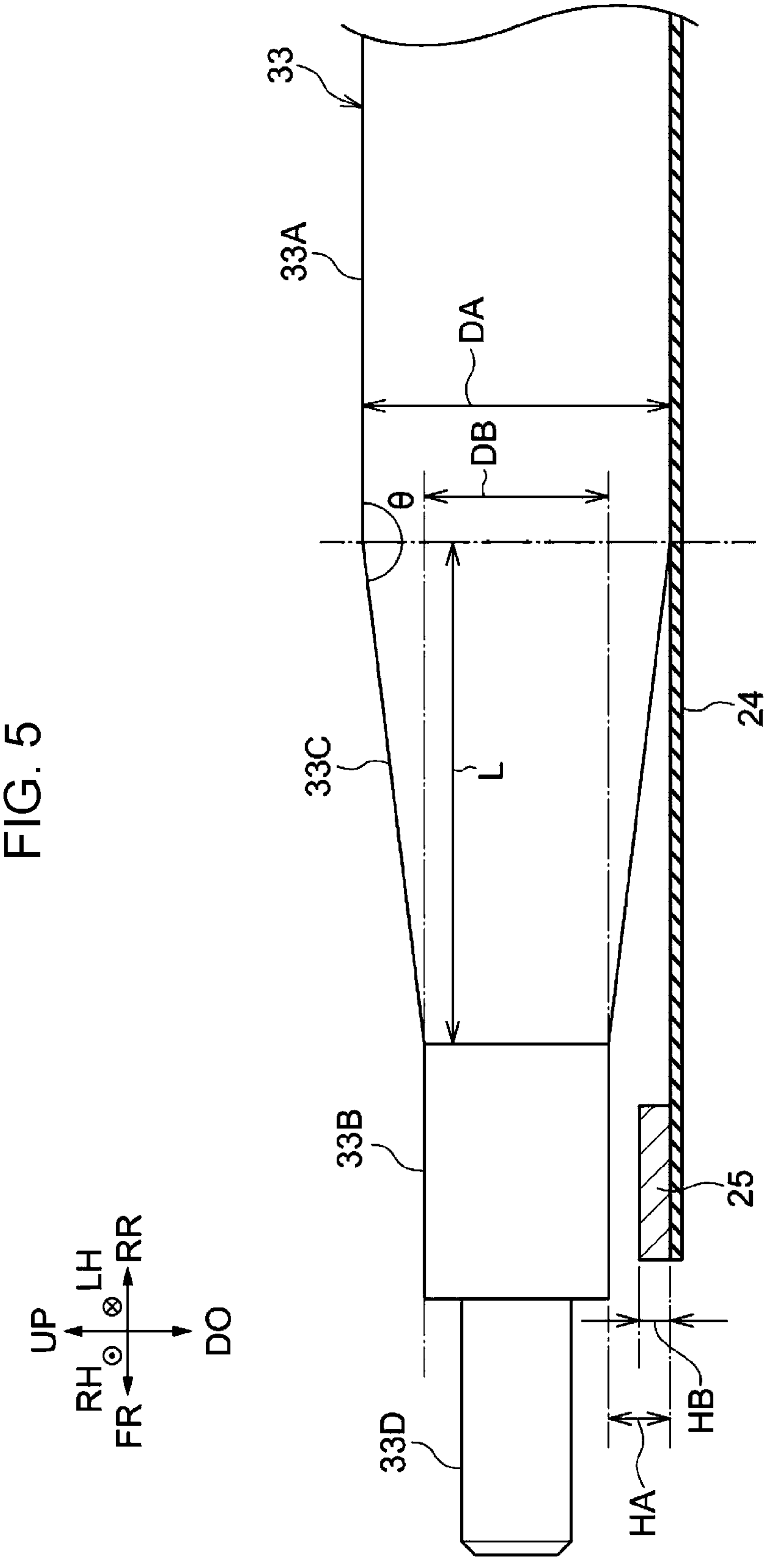
FIG. 5 is an enlarged side sectional view of the stretching roll illustrated in FIG. 4, the transfer belt, and one of the projections included in the transfer device according to the present exemplary embodiment.

The transfer device 30 according to the present exemplary embodiment will now be described. FIG. 2 schematically illustrates the transfer device 30. FIG. 3 is a side sectional view of a stretching roll 32, the transfer belt 24, and projections 25, all of which are to be described below, included in the transfer device 30. FIG. 4 is a side sectional view of a stretching roll 33, also to be described below, the transfer belt 24, and the projections 25 included in the transfer device 30. FIG. 5 is an enlarged side sectional view of the stretching roll 33, the transfer belt 24, and one of the projections 25 included in the transfer device 30.

The transfer device 30 is an exemplary belt rotating device and is configured to rotate the transfer belt 24 and to transfer an image. Specifically, referring to FIG. 2, the transfer device 30 includes the transfer belt 24, stretching rolls 31, 32, 33, and 34 (hereinafter also denoted by 31 to 34), first-transfer rolls 23, a second-transfer roll 39, and a sensor 42.

The transfer belt 24 is an exemplary endless belt to be rotated and having an annular shape as illustrated in FIG. 2. The transfer belt 24 is a structural part to which toner images are transferred from the photoconductors 21 of the toner-image-forming units 20Y to 20K and from which the toner images are transferred to a recording medium P (see FIG. 1).

In the present exemplary embodiment, the transfer belt 24 is stretched over the four stretching rolls 31 to 34 as illustrated in FIG. 2.

Referring to FIG. 3, the transfer belt 24 is provided on the inner peripheral surface thereof with the projections 25, which are located at two respective end portions in the axial direction (specifically, the front-rear direction). The projections 25 each extend in the peripheral direction of the transfer belt 24. Specifically, the projections 25 each have a belt shape and are located at one end portion and another end portion of the transfer belt 24 in the axial direction in such a manner as to extend over the entire periphery of the transfer belt 24. As illustrated in FIG. 3, the projections 25 each have a rectangular sectional shape.

Referring to FIGS. 1 and 2, the transfer device 30 includes four first-transfer rolls 23. As illustrated in FIG. 1, the four first-transfer rolls 23 are positioned against the respective photoconductors 21 of the toner-image-forming units 20Y to 20K with the transfer belt 24 interposed therebetween. The points between the first-transfer rolls 23 and the respective photoconductors 21 are defined as first-transfer positions, where the toner images formed on the respective photoconductors 21 are to be transferred to the transfer belt 24.

The second-transfer roll 39 is positioned against the stretching roll 32 with the transfer belt 24 interposed therebetween. The point between the second-transfer roll 39 and the stretching roll 32 is defined as a second-transfer position, where the toner images transferred to the transfer belt 24 are to be transferred to a recording medium P.

In the transfer device 30, the toner images in the respective colors formed on the photoconductors 21 of the toner-image-forming units 20Y to 20K are transferred to the transfer belt 24 by the respective first-transfer rolls 23 at the respective first-transfer positions while the transfer belt 24 is rotating. Then, the toner images thus transferred to the transfer belt 24 are transferred to a recording medium P by the second-transfer roll 39 at the second-transfer position.

The stretching rolls 31 to 34 are rolls over which the transfer belt 24 is stretched and are located on the inner peripheral side of the transfer belt 24. The transfer belt 24 is rotatably supported by being stretched over the stretching rolls 31 to 34. Therefore, the stretching rolls 31 to 34 are also regarded as supporting members that support the transfer belt 24.

The stretching rolls 31 and 32 are each an exemplary first roll and are each configured to limit the movement of the transfer belt 24 in the axial direction (specifically, the front-rear direction) by coming into contact with at least one of the projections 25 (see FIG. 3). The stretching roll 32 is configured as follows, for example.

Referring to FIG. 3, the stretching roll 32 includes, for example, a large-diameter portion 32A, small-diameter portions 32B, transition portions 32C, and shaft portions 32D. The small-diameter portions 32B are located on the respective axially outer sides relative to the large-diameter portion 32A and each have a smaller diameter than the large-diameter portion 32A. Specifically, the small-diameter portions 32B are located on the respective axially outer sides (specifically, on the front side and the rear side) relative to one axial end and the other axial end of the large-diameter portion 32A. In the present exemplary embodiment, the large-diameter portion 32A and the small-diameter portions 32B each have an outside diameter that is constant in the axial direction.

The transition portions 32C each have an outside diameter that decreases from the large-diameter portion 32A to a corresponding one of the small-diameter portions 32B. Seen in the radial direction, the outer peripheral surface of each of the transition portions 32C is inclined relative to the axial direction (specifically, the front-rear direction). When the outer peripheral surface of at least one of the transition portions 32C comes into contact with a corner of a corresponding one of the projections 25, the movement of the transfer belt 24 in the axial direction (specifically, the front-rear direction) is stopped.

The shaft portions 32D are each located on the axially outer side relative to a corresponding one of the small-diameter portions 32B. The shaft portions 32D each function as a supported part that is rotatably supported by a supporting part (not illustrated) such as a bearing.

The stretching roll 31, which is not illustrated in detail, has the same configuration as the stretching roll 32. When at least one of the transition portions (not illustrated) of the stretching roll 31 comes into contact with a corner of a corresponding one of the projections 25, the movement of the transfer belt 24 in the axial direction (specifically, the front-rear direction) is stopped.

Accordingly, the movement of the transfer belt 24 in the axial direction (specifically, the front-rear direction) is limited at two positions in the peripheral direction of the transfer belt 24 where the stretching rolls 31 and 32 that are each configured to come into contact with at least one of the projections 25 are located. Thus, in the present exemplary embodiment, the stretching rolls 31 and 32 each function as a meander correcting roll configured to correct the meander of the transfer belt 24.

The stretching roll 32 functions as a driving roll that is to be rotated by a drive source (not illustrated) in such a manner as to cause the transfer belt 24 to rotate (circulate) in one direction (the direction of arrow A provided in FIGS. 1 and 2). The stretching roll 32 functions as a counter roll (a so-called backup roll) that is positioned against the second-transfer roll 39.

The stretching rolls 31, 33, and 34 rotate by following the rotation of the transfer belt 24. That is, the stretching rolls 31, 33, and 34 each function as a follower roll. The stretching roll 31 is pressed against the transfer belt 24 toward the outer peripheral side (i.e., the radially outer side) of the transfer belt 24 and thus functions as a tension applying roll that applies a tension to the transfer belt 24.

Referring to FIG. 4, the stretching roll 33 is an exemplary second roll and includes, for example, a large-diameter portion 33A, small-diameter portions 33B, transition portions 33C, and shaft portions 33D. The small-diameter portions 33B are located on the respective axially outer sides relative to the large-diameter portion 33A and each have a smaller diameter than the large-diameter portion 33A. Specifically, the small-diameter portions 33B are located on the respective axially outer sides (specifically, on the front side and the rear side) relative to one axial end and the other axial end of the large-diameter portion 33A. In the present exemplary embodiment, the large-diameter portion 33A and the small-diameter portions 33B each have an outside diameter that is constant in the axial direction.

The transition portions 33C each have an outside diameter that decreases from the large-diameter portion 33A to a corresponding one of the small-diameter portions 33B. As illustrated in FIG. 4, the outer peripheral surface of each of the transition portions 33C is linear in sectional view in the radial direction. Specifically, seen in the radial direction, the outer peripheral surface of each of the transition portions 33C is inclined relative to the axial direction (specifically, the front-rear direction).

The shaft portions 33D are each located on the axially outer side relative to a corresponding one of the small-diameter portions 33B. The shaft portions 33D each function as a supported part that is rotatably supported by a supporting part (not illustrated) such as a bearing.

The stretching roll 33 is configured such that the transfer belt 24 is wrapped around the large-diameter portion 33A with the outer peripheral surfaces of the small-diameter portions 33B facing the respective projections 25 in the radial direction. Specifically, only the outer peripheral surfaces of the small-diameter portions 33B face the projections 25 in the radial direction. In other words, the stretching roll 33 faces the projections 25 in the radial direction only at the outer peripheral surfaces of the small-diameter portions 33B in the entire area within which the transfer belt 24 may move in the axial direction.

Referring to FIG. 5, the stretching roll 33 is configured such that the radial gap, HA, from a part of each of the outer peripheral surfaces of the small-diameter portions 33B that faces a corresponding one of the projections 25 to the outer peripheral surface of the large-diameter portion 33A is greater than the height, HB, of the projection 25 from the inner peripheral surface of the transfer belt 24.

In other words, as illustrated in FIG. 5, in a state where the inner peripheral surface of the transfer belt 24 lies on the extension of the outer peripheral surface of the large-diameter portion 33A (that is, in a state where two axial end portions of the transfer belt 24 are not deformed toward the inner peripheral side (toward the stretching roll 33)), the small-diameter portions 33B are spaced apart from the projections 25, that is, out of contact with the projections 25.

Furthermore, in the present exemplary embodiment, the distance, R2 (see FIG. 4), between the small-diameter portions 33B located at one axial end portion and another axial end portion of the stretching roll 33 is shorter than the distance, R1 (see FIG. 4), between the projections 25 located at one axial end portion and the other axial end portion of the transfer belt 24.

The large-diameter portion 33A and each of the transition portions 33C form an angle θ (see FIG. 5) of 170 degrees or greater at the connection therebetween. That is, the angle θ is 170 degrees or greater but smaller than 180 degrees.

Letting the axial length of each of the transition portions 33C be L; the outside diameter of the large-diameter portion 33A be DA; and the outside diameter of each of the small-diameter portions 33B be DB, a relationship of $L/(DA-DB)\geq 3$ is established.

In the transfer device 30, the stretching roll 34 may have the same configuration as the stretching roll 33.

The sensor 42 illustrated in FIGS. 2 and 4 is an exemplary detector and is a structural part configured to detect a detection object provided on the outer peripheral surface of the transfer belt 24. As illustrated in FIG. 2, the sensor 42 is located near the outer peripheral surface of the stretching roll 33. Specifically, the sensor 42 is located below the stretching roll 33.

More specifically, as illustrated in FIG. 4, the sensor 42 is located at a position in the axial direction of the stretching roll 33 that is near the outer peripheral surface of the large-diameter portion 33A (specifically, below the large-diameter portion 33A). The sensor 42 performs detection of the detection object in such a manner as to target a part of the transfer belt 24 that is wrapped around the large-diameter portion 33A. The detection object to be detected by the sensor 42 is specifically the toner images transferred to the outer peripheral surface of the transfer belt 24. More specifically, the sensor 42 of the transfer device 30 detects the toner images to detect, for example, any misregistration between the toner images in the respective colors and the densities of the toner images in the respective colors.

In the present exemplary embodiment, the sensor 42 is provided only below the large-diameter portion 33A and is thus prevented from performing detection of the detection object in such a manner as to target a part of the transfer belt 24 that is wrapped around either of the transition portions 33C.

The stretching rolls 31, 32, 33, and 34 of the transfer device 30 have outside diameters that decrease in that order. Accordingly, the outside diameter of the stretching roll 33 is smaller than the outside diameters of the stretching rolls 31 and 32.

Furthermore, the lengths by which the transfer belt 24 is wrapped around the stretching rolls 31, 32, 33, and 34 of the transfer device 30 decrease in that order. Accordingly, in the transfer device 30 including the stretching rolls 31 to 34, the length by which the transfer belt 24 is wrapped around is the greatest for the stretching roll 33 among those (namely, the stretching rolls 33 and 34) excluding the stretching rolls 31 and 32 that are each configured to come into contact with at least one of the projections 25. Note that the length by which the transfer belt 24 is wrapped around refers to the peripheral length by which the transfer belt 24 is in contact with the outer peripheral surface of the stretching roll of interest.

Functions of Exemplary Embodiment

As illustrated in FIG. 4, the stretching roll 33 according to the present exemplary embodiment includes the large-diameter portion 33A, the small-diameter portions 33B, and the transition portions 33C each having an outside diameter that decreases from the large-diameter portion 33A to a corresponding one of the small-diameter portions 33B.

Figure 6:
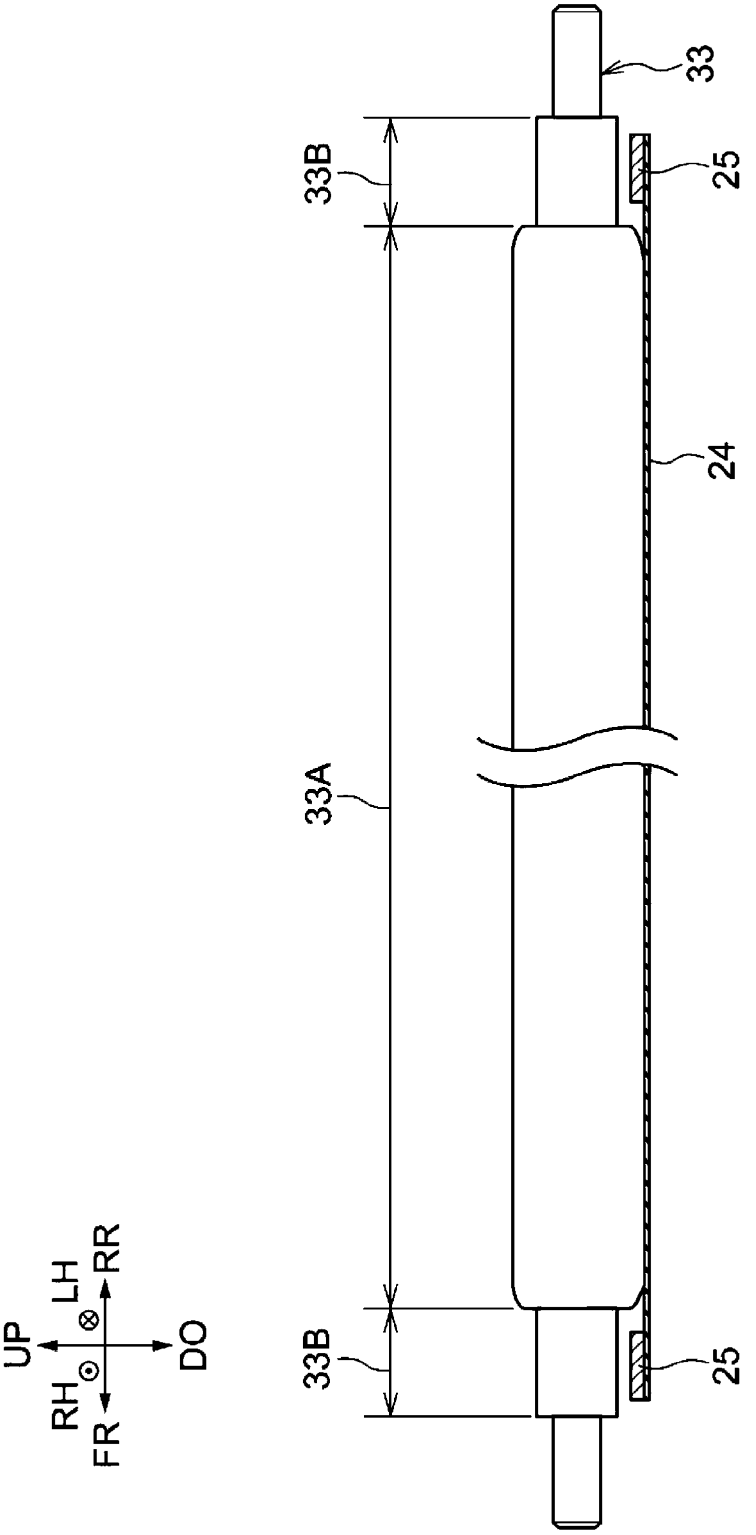
FIG. 6 is a side sectional view of a stretching roll according to a comparative embodiment.
Figure 7:
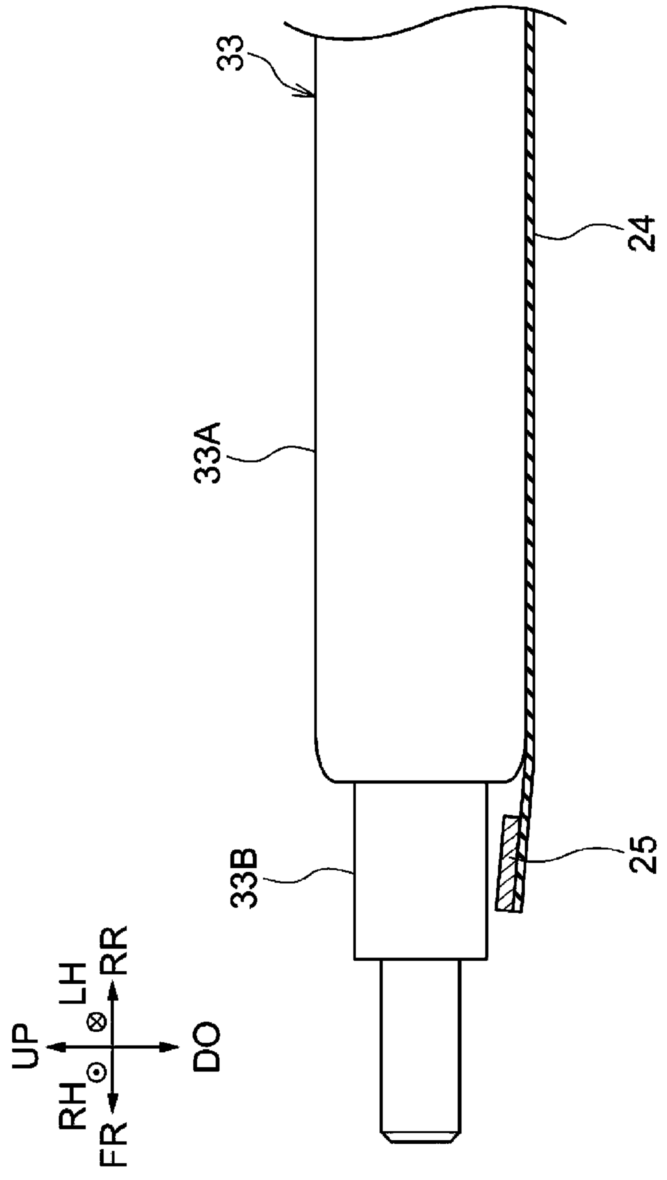
FIG. 7 is an enlarged side sectional view of the stretching roll according to the comparative embodiment.

Referring now to FIG. 6, in an embodiment where the stretching roll 33 includes a large-diameter portion 33A and small-diameter portions 33B, which are continuous with the large-diameter portion 33A on the respective axially outer sides relative to the large-diameter portion 33A, a step is formed between the large-diameter portion 33B and each of the small-diameter portions 33B. Such a configuration makes the transfer belt 24 be likely to bend toward the inner peripheral side at the boundary between the large-diameter portion 33A and the small-diameter portion 33B as illustrated in FIG. 7. If the transfer belt 24 repeatedly bends toward the inner peripheral side at the boundary between the large-diameter portion 33A and the small-diameter portion 33B, the transfer belt 24 may be broken.

In view of such circumstances, the present exemplary embodiment employs, as described above, the stretching roll 33 including the transition portions 33C each having an outside diameter that decreases from the large-diameter portion 33A to a corresponding one of the small-diameter portions 33B.

In the present exemplary embodiment, the outside diameter of the stretching roll 33 is smaller than the outside diameters of the stretching rolls 31 and 32. In the case of a roll having a smaller outside diameter, a part of the transfer belt 24 that is wrapped around the roll has a greater curvature and therefore bears a greater load, which is more likely to break the transfer belt 24.

In view of such circumstances, the present exemplary embodiment employs, as described above, the stretching roll 33 that includes the transition portions 33C each having an outside diameter that decreases from the large-diameter portion 33A to a corresponding one of the small-diameter portions 33B.

Furthermore, in the present exemplary embodiment employing the stretching rolls 31 to 34, the length by which the transfer belt 24 is wrapped around is the greatest for the stretching roll 33 among those (namely, the stretching rolls 33 and 34) excluding the stretching rolls 31 and 32 that are each configured to come into contact with at least one of the projections 25. In a case where the transfer belt 24 is wrapped around a roll by a greater length, a greater part of the transfer belt 24 is bent, which therefore applies a greater load to the transfer belt 24 and is more likely to break the transfer belt 24.

In view of such circumstances, the present exemplary embodiment employs, as described above, the stretching roll 33 that includes the transition portions 33C each having an outside diameter that decreases from the large-diameter portion 33A to a corresponding one of the small-diameter portions 33B.

Furthermore, the stretching roll 33 according to the present exemplary embodiment is configured such that the transfer belt 24 is wrapped around the large-diameter portion 33A with the outer peripheral surfaces of the small-diameter portions 33B facing the respective projections 25 in the radial direction.

Therefore, compared with a case where the stretching roll 33 is configured such that the transfer belt 24 is wrapped around the large-diameter portion 33A with only the outer peripheral surfaces of the transition portions 33C facing the projections 25 in the radial direction, a space is assuredly provided between each of the small-diameter portions 33B and the transfer belt 24, which allows an increase in the height HB of each of the projections 25 from the inner peripheral surface of the transfer belt 24.

More specifically, the stretching roll 33 according to the present exemplary embodiment is configured such that the transfer belt 24 is wrapped around the large-diameter portion 33A with only the outer peripheral surfaces of the small-diameter portions 33B facing the projections 25 in the radial direction.

Therefore, compared with a case where the stretching roll 33 is configured such that transfer belt 24 is wrapped around the large-diameter portion 33A with the outer peripheral surfaces of the transition portions 33C facing the projections 25 in the radial direction, a space is assuredly provided between each of the small-diameter portions 33B and the transfer belt 24, which allows an increase in the height HB of each of the projections 25 from the inner peripheral surface of the transfer belt 24.

Furthermore, in the present exemplary embodiment, the large-diameter portion 33A and each of the transition portions 33C form an angle θ (see FIG. 5) of 170 degrees or greater at the connection therebetween.

Figure 8:
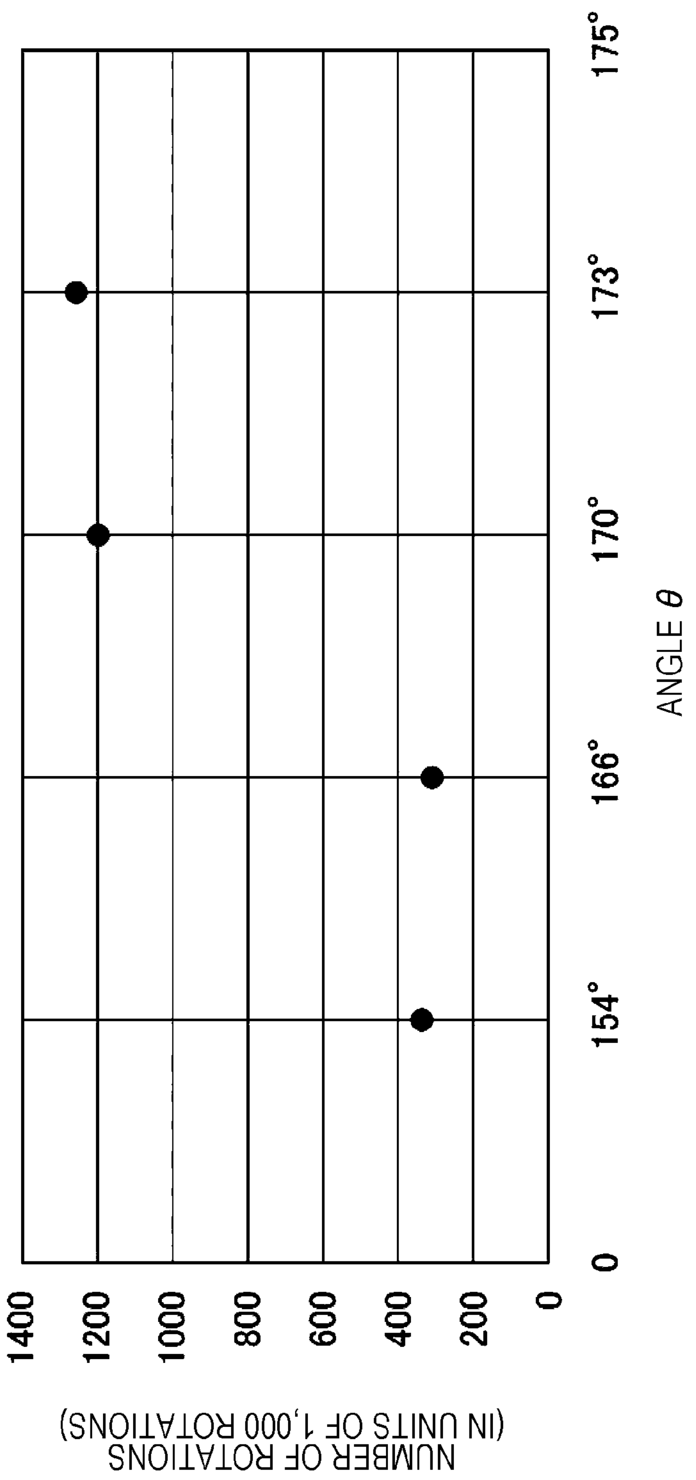
FIG. 8 is a graph illustrating the relationship between an angle θ and the breakage of the transfer belt.

Referring now to FIG. 8, if the angle θ is 170 degrees, the transfer belt 24 breaks after undergoing 1,200,000 rotations; if the angle θ is smaller than 170 degrees (for example, if the angle θ is 166 degrees), the transfer belt 24 breaks after undergoing about 300,000 rotations.

In FIG. 8, the horizontal axis represents the angle θ, and the vertical axis represents the number of rotations undergone by the transfer belt 24 before the transfer belt 24 breaks.

In the present exemplary embodiment, letting the axial length of each of the transition portions 33C be L; the outside diameter of the large-diameter portion 33A be DA; and the outside diameter of each of the small-diameter portions 33B be DB, a relationship of $L/(DA-DB) \geq 3$ is established.

Figure 9:
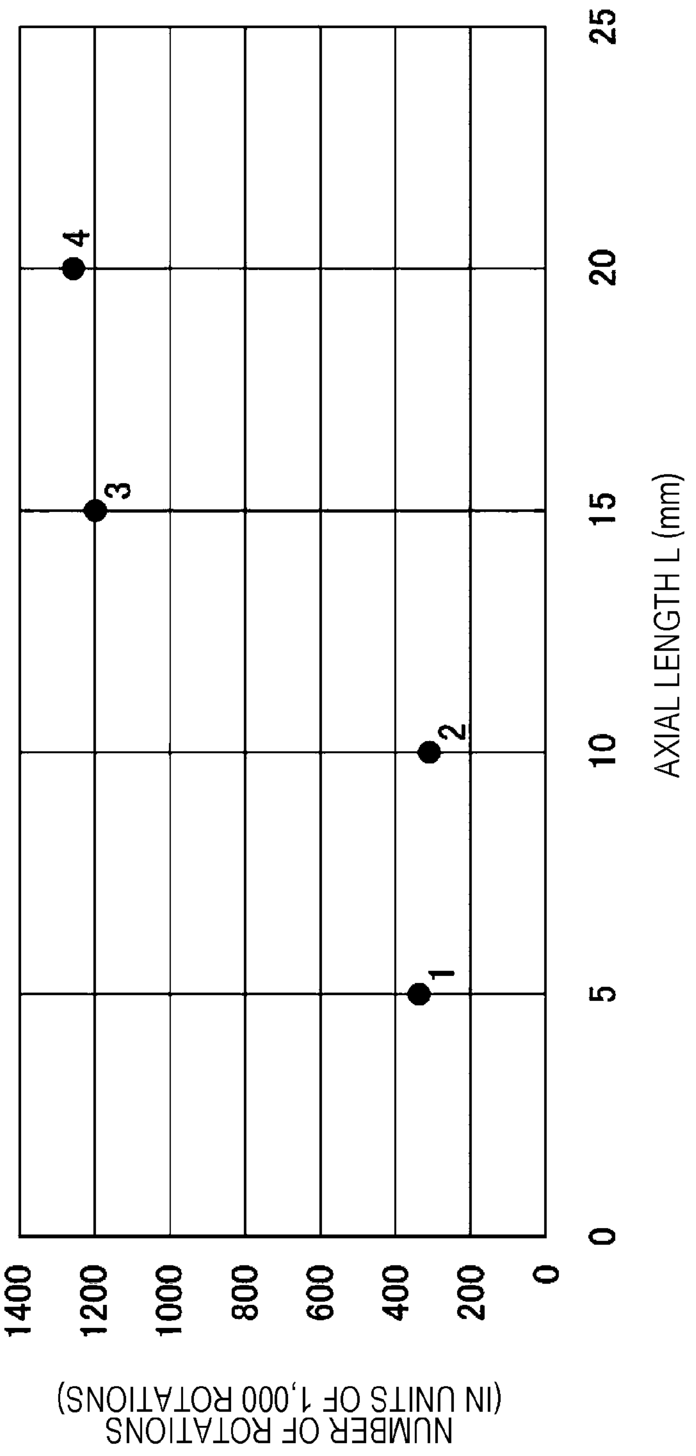
FIG. 9 is a graph illustrating the relationship between a value of L/(DA−DB) and the breakage of the transfer belt.

Referring now to FIG. 9, if the value of L/(DA−DB) is 3, the transfer belt 24 breaks after undergoing 1,200,000 rotations; if the value of L/(DA−DB) is smaller than 3 (for example, if the value is 2), the transfer belt 24 breaks after undergoing about 300,000 rotations.

In FIG. 9, the horizontal axis represents the axial length L of each of the transition portions 33C, and the vertical axis represents the number of rotations undergone by the transfer belt 24 before the transfer belt 24 breaks. Furthermore, the numbers provided beside the dots in the graph are each the value of L/(DA−DB)

As illustrated in FIG. 4, the stretching roll 33 according to the present exemplary embodiment is configured such that the outer peripheral surface of each of the transition portions 33C is linear in sectional view in the radial direction.

Therefore, the inclination (gradient) of each of the transition portions 33C is gentler than in a case where the outer peripheral surface of each of the transition portions 33C is concave toward the radially inner side in sectional view in the radial direction.

In the present exemplary embodiment, the sensor 42 performs detection of the detection object in such a manner as to target a part of the transfer belt 24 that is wrapped around the large-diameter portion 33A of the stretching roll 33.

Therefore, the distance between the sensor 42 and the transfer belt 24 is less likely to change than in a case where the sensor 42 performs detection of the detection object in such a manner as to target only a part of the transfer belt 24 that is wrapped around either of the transition portions 33C of the stretching roll 33.

More specifically, in the present exemplary embodiment, the sensor 42 is prevented from performing detection of the detection object in such a manner as to target a part of the transfer belt 24 that is wrapped around either of the transition portions 33C.

Therefore, the distance between the sensor 42 and the transfer belt 24 is less likely to change than in a case where the sensor 42 performs detection of the detection object in such a manner as to target a part of the transfer belt 24 that is wrapped around either of the transition portions 33C of the stretching roll 33.

Modifications of Stretching Roll 33

While the above exemplary embodiment relates to a case where the large-diameter portion 33A of the stretching roll 33 has an outside diameter that is constant in the axial direction, the large-diameter portion 33A is not limited thereto.

Figure 10:
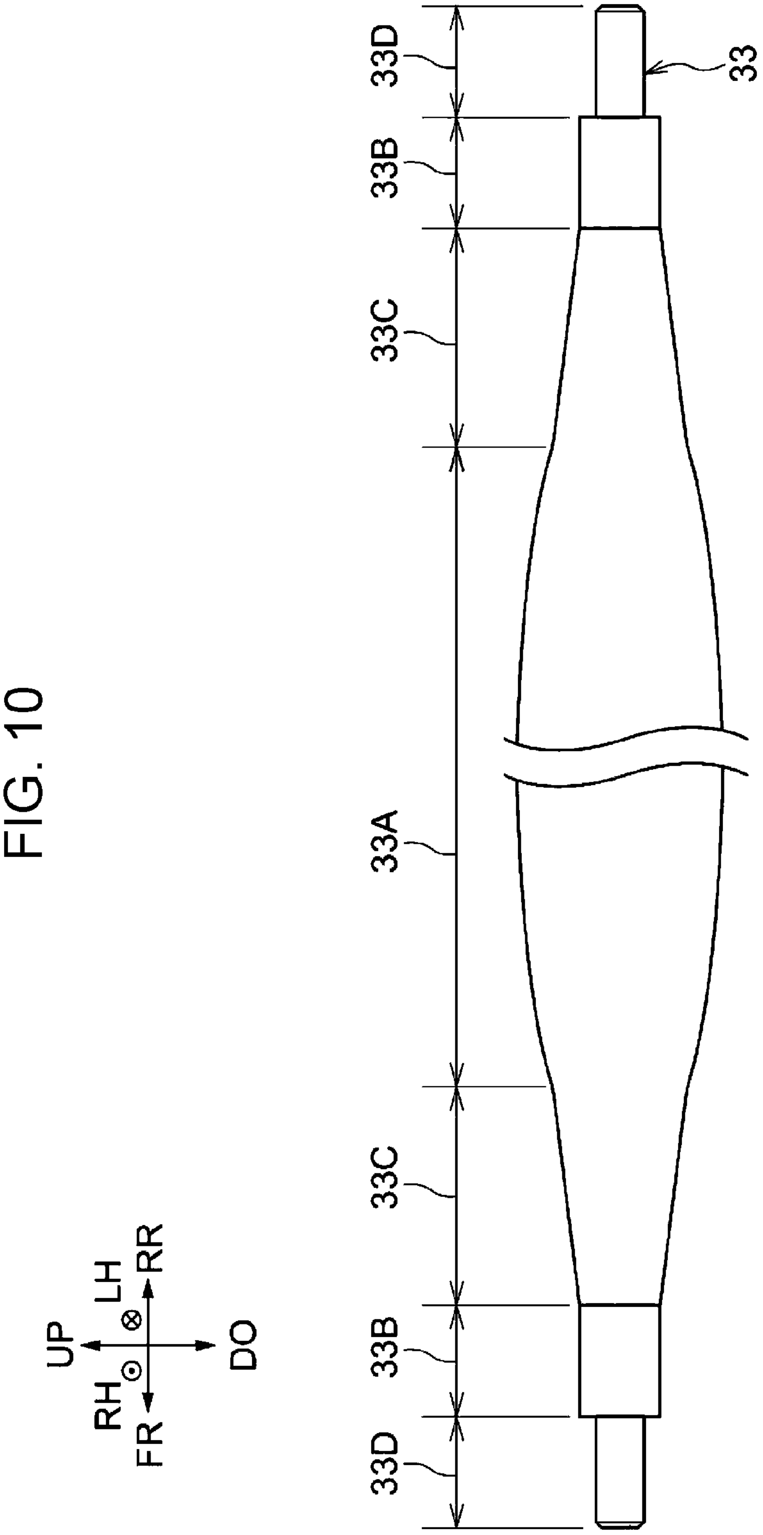
FIG. 10 is a side view of a stretching roll according to a modification.

For example, as illustrated in FIG. 10, the large-diameter portion 33A of the stretching roll 33 may have a greater outside diameter in an axially central part thereof than in axial end parts thereof. In the modification illustrated in FIG. 10, the outside diameter of the large-diameter portion 33A gradually decreases from the axially central part thereof to each of one axial end part and the other axial end part thereof.

In such a modification, the transfer belt 24 is tensed by the large-diameter portion 33A from the axially central part toward each of the one axial end part and the other axial end part and is therefore less likely to wrinkle.

While the above exemplary embodiment relates to a case where the stretching roll 33 is configured such that the transfer belt 24 is wrapped around the large-diameter portion 33A with only the outer peripheral surfaces of the small-diameter portions 33B facing the projections 25 in the radial direction, the stretching roll 33 is not limited thereto. For example, the stretching roll 33 may be configured such that the transfer belt 24 is wrapped around the large-diameter portion 33A with the outer peripheral surfaces of the transition portions 33C facing the projections 25 in the radial direction.

That is, the stretching roll 33 only needs to be configured such that the transfer belt 24 is wrapped around the large-diameter portion 33A with the outer peripheral surface of at least one of each of the small-diameter portions 33B and each of the pair of transition portions 33C facing a corresponding one of the projections 25 in the radial direction.

While the above exemplary embodiment relates to a case where the large-diameter portion 33A and each of the transition portions 33C form an angle θ (see FIG. 5) of 170 degrees or greater at the connection therebetween, the angle θ is not limited thereto. For example, the angle θ may be smaller than 170 degrees.

While the above exemplary embodiment relates to a case where letting the axial length of each of the transition portions 33C be L; the outside diameter of the large-diameter portion 33A be DA; and the outside diameter of each of the small-diameter portions 33B be DB, a relationship of $L/(DA-DB) \geq 3$ is established, the relationship is not limited thereto. For example, a configuration that establishes a relationship of $L/(DA-DB) < 3$ may be employed.

While the above exemplary embodiment relates to a case where, as illustrated in FIG. 4, the outer peripheral surface of each of the transition portions 33C of the stretching roll 33 is linear in sectional view in the radial direction, the shape of the outer peripheral surface is not limited thereto. For example, the outer peripheral surface of each of the transition portions 33C may be concave toward the radially inner side in sectional view in the radial direction.

Other Modifications

While the above exemplary embodiment relates to a case where the sensor 42 performs detection of the detection object in such a manner as to target a part of the transfer belt 24 that is wrapped around the large-diameter portion 33A of the stretching roll 33, the sensor 42 is not limited thereto. For example, the sensor 42 may perform detection of the detection object in such a manner as to target a part of the transfer belt 24 that is wrapped around either of the transition portions 33C of the stretching roll 33.

While the above exemplary embodiment employs the transfer belt 24 as an exemplary endless belt, the endless belt is not limited thereto. For example, the endless belt may be a transporting belt, and the use of the endless belt is not limited. Accordingly, the belt rotating device is not limited to a transfer device and may be, for example, a transporting device including a transporting belt, or any other device that is configured to rotate an endless belt.

While the above exemplary embodiment relates to a case where the transfer belt 24 is stretched over the four stretching rolls 31 to 34, the way of stretching the transfer belt 24 is not limited thereto. The transfer belt 24 only needs to be stretched over at least two stretching rolls.

While the above exemplary embodiment relates to a case where the stretching roll 32 serves as a driving roll, the driving roll is not limited thereto and may be any one or each of a plurality of the stretching rolls 31 to 34.

While the above exemplary embodiment relates to a case where the stretching roll 31 serves as a tension applying roll, the tension applying roll is not limited thereto and may be any one or each of a plurality of the stretching rolls 31 to 34.

The present disclosure is not limited to the above exemplary embodiment, and the above exemplary embodiment may be modified, changed, or improved in various ways without departing from the essence of the present disclosure. For example, the above modifications may be combined in any way thereamong.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A belt rotating device comprising:

an endless belt to be rotated;

a projection provided at an axial end portion of an inner peripheral surface of the endless belt and extending in a peripheral direction of the endless belt;

a first roll around which the endless belt is wrapped, the first roll being configured to limit an axial movement of the endless belt by coming into contact with the projection; and a second roll including a large-diameter portion, a small-diameter portion, and a transition portion, the small-diameter portion being located on an axially outer side relative to the large-diameter portion and having a smaller diameter than the large-diameter portion, the transition portion having an outside diameter that decreases from the large-diameter portion to the small-diameter portion, wherein the second roll is configured such that the endless belt is wrapped around the large-diameter portion with an outer peripheral surface of at least one of the small-diameter portion and the transition portion facing the projection in a radial direction, and such that a radial gap from a part of the outer peripheral surface where the outer peripheral surface faces the projection to an outer peripheral surface of the large-diameter portion is greater than a height of the projection from the inner peripheral surface of the endless belt.

(((2)))

The belt rotating device according to (((1))), wherein the second roll is configured such that the endless belt is wrapped around the large-diameter portion with the outer peripheral surface of the small-diameter portion facing the projection in the radial direction.

(((3)))

The belt rotating device according to (((2))), wherein the second roll is configured such that the endless belt is wrapped around the large-diameter portion with only the outer peripheral surface of the small-diameter portion facing the projection in the radial direction.

(((4)))

The belt rotating device according to any one of (((1))) to (((3))), wherein the large-diameter portion and the transition portion form an angle of 170 degrees or greater at a connection between the large-diameter portion and the transition portion.

(((5)))
The belt rotating device according to any one of (((1))) to (((4))),
wherein letting an axial length of the transition portion be L; an outside diameter of the large-diameter portion be DA; and an outside diameter of the small-diameter portion be DB, a relationship of L/(DA−DB)≥3 is established.

(((6)))
The belt rotating device according to any one of (((1))) to (((5))),
wherein the outer peripheral surface of the transition portion is linear in sectional view in the radial direction.

(((7)))
The belt rotating device according to any one of (((1))) to (((6))), further comprising:
a detector provided near an outer peripheral surface of the second roll and configured to detect a detection object provided on an outer peripheral surface of the endless belt, the detector performing detection of the detection object in such a manner as to target a part of the endless belt, the part being wrapped around the large-diameter portion.

(((8)))
The belt rotating device according to (((7))),
wherein the detector is
prevented from performing detection of the detection object in such a manner as to target a part of the endless belt, the part being wrapped around the transition portion.

(((9)))
The belt rotating device according to (((7))),
wherein the second roll has
a greater outside diameter in an axially central part of the large-diameter portion than in two axial end parts of the large-diameter portion.

(((10)))
The belt rotating device according to any one of (((1))) to (((9))),
wherein the second roll has a smaller outside diameter than the first roll.

(((11)))
The belt rotating device according to any one of (((1))) to (((10))),
wherein the endless belt is stretched over at least three rolls including the first roll and the second roll, and
wherein a length by which the endless belt is wrapped around is greatest for the second roll among the at least three rolls excluding the first roll.

(((12)))
An image forming apparatus comprising:
the belt rotating device according to any one of (((1))) to (((11))),
wherein the endless belt serves as a transfer belt to which an image is to be transferred and from which the image is to be transferred to a recording medium.

What is claimed is:

1. A belt rotating device comprising:
an endless belt to be rotated;
a projection provided at an axial end portion of an inner peripheral surface of the endless belt and extending in a peripheral direction of the endless belt;
a first roll around which the endless belt is wrapped, the first roll being configured to limit an axial movement of the endless belt by coming into contact with the projection; and
a second roll including a large-diameter portion, a small-diameter portion, and a transition portion, the small-diameter portion being located on an axially outer side relative to the large-diameter portion and having a smaller diameter than the large-diameter portion, the transition portion having an outside diameter that decreases from the large-diameter portion to the small-diameter portion,
wherein the second roll is configured such that the endless belt is wrapped around the large-diameter portion with an outer peripheral surface of at least one of the small-diameter portion and the transition portion facing the projection in a radial direction, and such that a radial gap from a part of the outer peripheral surface where the outer peripheral surface faces the projection to an outer peripheral surface of the large-diameter portion is greater than a height of the projection from the inner peripheral surface of the endless belt.

2. The belt rotating device according to claim 1,
wherein the second roll is configured such that the endless belt is wrapped around the large-diameter portion with the outer peripheral surface of the small-diameter portion facing the projection in the radial direction.

3. The belt rotating device according to claim 2,
wherein the second roll is configured such that the endless belt is wrapped around the large-diameter portion with only the outer peripheral surface of the small-diameter portion facing the projection in the radial direction.

4. An image forming apparatus comprising:
the belt rotating device according to claim 3,
wherein the endless belt serves as a transfer belt to which an image is to be transferred and from which the image is to be transferred to a recording medium.

5. An image forming apparatus comprising:
the belt rotating device according to claim 2,
wherein the endless belt serves as a transfer belt to which an image is to be transferred and from which the image is to be transferred to a recording medium.

6. The belt rotating device according to claim 1,
wherein the large-diameter portion and the transition portion form an angle of 170 degrees or greater at a connection between the large-diameter portion and the transition portion.

7. An image forming apparatus comprising:
the belt rotating device according to claim 6,
wherein the endless belt serves as a transfer belt to which an image is to be transferred and from which the image is to be transferred to a recording medium.

8. The belt rotating device according to claim 1,
wherein letting an axial length of the transition portion be L; an outside diameter of the large-diameter portion be DA; and an outside diameter of the small-diameter portion be DB, a relationship of L/(DA−DB)≥3 is established.

9. An image forming apparatus comprising:
the belt rotating device according to claim 8,
wherein the endless belt serves as a transfer belt to which an image is to be transferred and from which the image is to be transferred to a recording medium.

10. The belt rotating device according to claim 1,
wherein the outer peripheral surface of the transition portion is linear in sectional view in the radial direction.

11. An image forming apparatus comprising:
the belt rotating device according to claim 10,
wherein the endless belt serves as a transfer belt to which an image is to be transferred and from which the image is to be transferred to a recording medium.

12. The belt rotating device according to claim 1, further comprising:

a detector provided near an outer peripheral surface of the second roll and configured to detect a detection object provided on an outer peripheral surface of the endless belt, the detector performing detection of the detection object in such a manner as to target a part of the endless belt, the part being wrapped around the large-diameter portion.

13. The belt rotating device according to claim 12, wherein the detector is prevented from performing detection of the detection object in such a manner as to target a part of the endless belt, the part being wrapped around the transition portion.

14. An image forming apparatus comprising:

the belt rotating device according to claim 13, wherein the endless belt serves as a transfer belt to which an image is to be transferred and from which the image is to be transferred to a recording medium.

15. The belt rotating device according to claim 12, wherein the second roll has a greater outside diameter in an axially central part of the large-diameter portion than in two axial end parts of the large-diameter portion.

16. An image forming apparatus comprising:

the belt rotating device according to claim 15, wherein the endless belt serves as a transfer belt to which an image is to be transferred and from which the image is to be transferred to a recording medium.

17. An image forming apparatus comprising:

the belt rotating device according to claim 12, wherein the endless belt serves as a transfer belt to which an image is to be transferred and from which the image is to be transferred to a recording medium.

18. The belt rotating device according to claim 1, wherein the second roll has a smaller outside diameter than the first roll.

19. The belt rotating device according to claim 1, wherein the endless belt is stretched over at least three rolls including the first roll and the second roll, and wherein a length by which the endless belt is wrapped around is greatest for the second roll among the at least three rolls excluding the first roll.

20. An image forming apparatus comprising:

the belt rotating device according to claim 1, wherein the endless belt serves as a transfer belt to which an image is to be transferred and from which the image is to be transferred to a recording medium.

* * * * *